(12) United States Patent
Haller et al.

(10) Patent No.: US 10,266,079 B2
(45) Date of Patent: Apr. 23, 2019

(54) ADJUSTABLE DAMPING SYSTEM FOR A VEHICLE SEAT

(71) Applicant: GRAMMER AG, Amberg (DE)

(72) Inventors: Erwin Haller, Birgland (DE); Jens Kolb, Konigstein (DE); Konstantin Krivenkov, Amberg (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/480,566

(22) Filed: Apr. 6, 2017

(65) Prior Publication Data

US 2017/0305311 A1    Oct. 26, 2017

(30) Foreign Application Priority Data

Apr. 25, 2016   (DE) .................. 10 2016 107 626

(51) Int. Cl.
  *B60N 2/50*  (2006.01)
  *B60N 2/38*  (2006.01)
  *B60N 2/52*  (2006.01)

(52) U.S. Cl.
  CPC ............... *B60N 2/505* (2013.01); *B60N 2/38* (2013.01); *B60N 2/501* (2013.01); *B60N 2/508* (2013.01); *B60N 2/522* (2013.01); *B60N 2/525* (2013.01)

(58) Field of Classification Search
  CPC ........ B60N 2/508; B60N 2/502; B60N 2/505; B60N 2/605; B60N 2/38; B60N 2/501; B60N 2/522; B60N 2/525
  See application file for complete search history.

(56) References Cited

U.S. PATENT DOCUMENTS 5,358,305 A    10/1994  Kaneko et al.
5,652,704 A *  7/1997  Catanzarite ............ B60N 2/501
                                                       248/550

(Continued)

FOREIGN PATENT DOCUMENTS

DE        600 26 661 T2     12/2006
DE      60 2005 004 224 T2  12/2008
DE     10 2008 058 409 A1    7/2009

OTHER PUBLICATIONS

Search Report prepared by the German Patent Office dated Mar. 3, 2017, for German Patent Application No. 102016107626.0.

*Primary Examiner* — Nkeisha Smith
(74) *Attorney, Agent, or Firm* — Sheridan Ross PC

(57) ABSTRACT

The invention relates to an adjustable damping system for a vehicle seat for damping a movement of the seat part-side upper part relative to the body-side lower part in at least one spatial direction, wherein, for damping, at least one damping element is provided, which is adjustable by an adjustment device and is arranged between the seat part-side upper part and the body-side lower part. The damping system is further distinguished in that a first damping force of the damping element is settable by the adjustment device, wherein this first damping force can be determined by the adjustment device, with the aid of a total damping travel of the damping element, a basic damping force presettable by a damping setting device, a position of the seat part-side upper part, measurable by a sensor device, relative to the body-side lower part and a movement direction of the seat part-side upper part relative to the body-side lower part, wherein the movement direction can be determined from at least two temporally consecutive positions of the seat part-side upper part, measurable by the sensor device, relative to the body-side lower part.

18 Claims, 6 Drawing Sheets

(56) References Cited

U.S. PATENT DOCUMENTS

| | | | |
|---|---|---|---|
| 5,908,456 A | 6/1999 | Wahlers | |
| 5,975,508 A * | 11/1999 | Beard | B60N 2/501 180/89.12 |
| 6,120,082 A * | 9/2000 | Vandermolen | B60N 2/02 248/550 |
| 6,371,456 B1 | 4/2002 | Ritchie et al. | |
| 7,694,946 B2 * | 4/2010 | Shoemaker | B60N 2/501 248/550 |
| 7,975,813 B2 * | 7/2011 | Spangler | B60N 2/38 188/267 |
| 8,864,145 B2 * | 10/2014 | Haller | B60N 2/501 280/124.157 |
| 9,115,781 B2 * | 8/2015 | Kolb | B60G 17/0416 |
| 9,580,115 B2 * | 2/2017 | Haller | B60N 2/501 |
| 9,688,173 B2 * | 6/2017 | Ulrich | B60N 2/52 |
| 9,694,727 B2 * | 7/2017 | Haller | B60N 2/501 |
| 9,758,078 B2 * | 9/2017 | Haller | B60N 2/505 |
| 2006/0237885 A1 * | 10/2006 | Paillard | B60N 2/501 267/140.15 |
| 2010/0213345 A1 * | 8/2010 | Haller | B60N 2/501 248/550 |
| 2011/0024601 A1 * | 2/2011 | Shoemaker | B60N 2/501 248/636 |
| 2015/0232004 A1 * | 8/2015 | Haller | B60N 2/501 248/562 |
| 2015/0232005 A1 * | 8/2015 | Haller | B60N 2/505 248/562 |

* cited by examiner

ADJUSTABLE DAMPING SYSTEM FOR A VEHICLE SEAT

CROSS-REFERENCE TO RELATED APPLICATIONS

This application claims the benefit of German Patent Application No. DE 10 2016 107 626.0 filed Apr. 25, 2016, the entire contents of which are incorporated herein by reference.

FIELD

The invention relates to an adjustable damping system for a vehicle seat for damping a movement of a seat part-side upper part relative to a body-side lower part in at least one spatial direction (X, Y, Z), wherein, for damping, at least one damping element is provided, which has a total damping travel, is adjustable by an adjustment device and is arranged between the seat part-side upper part and the body-side lower part.

BACKGROUND

In particular in the case of off-road vehicles, such as construction machines and tractors, the vehicle seat greatly influences the driving comfort. Excessive vibrations, jolts and movements that are transmitted from the road surface via the vehicle seat to the person located on the seat can lead to fatigue and in the longer term also to an adverse effect on health, such as, for example, back pain or bone erosion, of the person. Damping/suspension systems are generally used to minimise influences of this type. For this purpose, various suspension variants are known in principle, which differ with respect to complexity and energy requirement: passive, semi-active and active suspension systems. In the case of passive vehicle seats, the properties of the system components are structurally predetermined and cannot be changed during operation. In the case of semi-active suspension systems, the dissipative properties of the seat suspension can be influenced in a targeted manner depending on the respective situation. Either the hardness of the damper can be adjusted and/or the stiffness of the spring can be adapted. In active systems, energy can additionally be introduced into the system by suitable actuators.

Damping/suspension systems of this type generally have a maximum damping/spring travel. For an off-road journey, the forces acting on the vehicle or the vehicle seat may be so great that the damping/suspension system undergoes large deflections. Owing to the finite mechanical limitations of the conventional damping/suspension systems, large forces acting on the seat can bring about an end impact of the damping/suspension system. Different damper systems are known in order to avoid end impacts of this type. For example, passive dampers having a spring travel-dependent or suspension speed-dependent damping force are known. Furthermore, actively or semi-actively adjustable damper technologies are known in the prior art. Adjustable damper technologies are based, for example, on electro-/magneto-rheological systems or on an electrically or mechanically controlled through-flow change of the damper. Known algorithms for the active adjustment of the damping are, for example, the Skyhook rebound control or the Huang adjustment algorithm.

A pure speed-dependent passive or adjusted damper does not utilise the spring travel still available, which, on the one hand, could be utilised or is no longer present. This type of damper is designed either for the worst case, in which each impact is avoided in each possible seat setting, or for an adequate spring travel. In the first case, the setting is generally felt to be too hard and, in the second case, unpleasant impacts cannot be avoided in the edge positions. Travel-dependent passive dampers, at the end of the spring travel, provide a harder damping, but this damping is also inefficiently and unpleasantly active when springing back, wherein adequate spring travel is again present.

A damping adjustment should moreover also allow a user-specific damper presetting.

SUMMARY

The object of the present invention is to provide a damper system, which overcomes the drawbacks mentioned above. Furthermore, the object is to provide a driver's seat having a damper system of this type. A further object of the invention is to provide a method for adjusting an adjustable damping system that overcomes the drawbacks mentioned above.

This object is achieved by an adjustable damping system for a vehicle seat for damping a movement of a seat part-side upper part relative to a body-side lower part in at least one spatial direction (X, Y, Z), wherein for damping, at least one damping element is provided, which is adjustable by an adjustment device and is arranged between the seat part-side upper part and the body-side lower part. The damping system is further distinguished in that a first damping force of the damping element is settable by the adjustment device, wherein this first damping force can be determined by the adjustment device, with the aid of a total damping travel of the damping element, a basic damping force presettable by a damping setting device, a position of the seat part-side upper part, measurable by a sensor device, relative to the body-side lower part and a movement direction of the seat part-side upper part relative to the body-side lower part, wherein the movement direction can be determined from at least two temporally consecutive positions of the seat part-side upper part, measurable by the sensor device, relative to the body-side lower part.

The damping element may be based here on any damper technology. Electro-/magneto-rheological dampers or else hydraulic dampers with an electrically or mechanically controlled through-flow or else hydraulic dampers in combination with a hydraulic fluid pump would be conceivable. Accordingly, the damping may preferably be active or semi-active. The damper force is often also called the damping intensity. The damper behaviour of the damping system according to the invention can thus be set/adjusted depending on the user-specific basic damping force, the position and the movement of the seat part-side upper part, preferably within the available damping travel. The first damping force is accordingly settable independently of the amount of speed, but depending on the movement direction and the current position of the seat part-side upper part relative to the body-side lower part. The determination according to the invention of the first damping force has the advantage that a certain damping force is already set at low deflection/rebound speeds.

According to the invention, the adjustable damping system is designed for damping a movement of a seat part-side upper part relative to a body-side lower part in at least one spatial direction (X, Y, Z). Accordingly, a damping of vibrations can take place in the vertical direction (Z) but a damping of horizontal vibrations (X, Y) can also take place. Therefore, an exclusively vertically acting damping system, a horizontal damping system or a damping system acting in all three spatial directions (X, Y, Z) can be provided by the adjustable damping system. The terms height position, minimum settable height position, maximum settable height position and height setting device will be used below. These terms are not only understood here in relation to a vertical deflection (Z) but also analogously apply in every other spatial direction (X, Y). A corresponding height position therefore relates to the respective damping travel of the damping element.

For example position 1 on the graph, avPos=FEm, maxu<Pos<maxo, with/resulting in $kESo1 \neq 0$; $kESu2=0$; and $kESo2=0$. Also for example position 1, in a further example, avPos=FEm, FEu<Pos<FEo, with/resulting in $kESu1=kESo1 \neq 0$; $kESu2 \neq 0$; and $kESo2 \neq 0$. For example position 2 on the graph, avPos>KGo, maxu<Pos<Feo, with/resulting in $kESu1<kESo1$; $kESu2=0$; and $kESo2 \neq 0$. For example position 3 on the graph, avPos<KGu, FEu<Pos<maxo, with/resulting in $kESu1>kESo1$; $kESu2 \neq 0$, and $kESo2=0$.

A maximum displacement of the position of the seat part-side upper part relative to the body-side lower part is preferably provided by the total damping travel of the damping element, which is limited by an upper and a lower damping travel end. A height position of the seat part-side upper part, being the desired value of the adjustment, relative to the body-side lower part is preferably settable by a height setting device. Ideally, a maximum settable height position is in a range of the total damping travel, which preferably extends between a total damping travel centre and the upper damping travel end. Moreover, it is advantageous if a minimum settable height position is in a range of the total damping travel, which extends between a total damping travel centre and the lower damping travel end. Accordingly, the preset height position is the desired value of the adjustment and the current position of the seat part-side upper part relative to the body-side lower part is the actual value of the adjustment. In the following, the designation "above" signifies a direction towards the seat part-side upper part and the designation "below" signifies a direction towards the body-side lower part. The first damping force set by the adjustment device can preferably be determined with the aid of a preset user-specific basic damping force, a residual damping travel, which can preferably be determined by the total damping travel, and the current position of the seat part-side upper part, a preset height position and the movement direction of the seat part-side upper part. For example, a vertically sprung seat has a total damping travel of 180 mm. The range of the total damping travel, which is used for the height adjustment and is limited by the maximum and minimum settable height position, is for example 80 mm. Thus, a most favourable available spring travel of 90 mm is brought about in both directions or +/−50 mm and −/+130 mm in unfavourable cases.

According to a preferred embodiment, upon a displacement of the position of the seat part-side upper part proceeding from the height position, the first damping force of the damping element, settable by the adjustment device, within a comfort range of the total damping travel, is smaller than outside the comfort range. The comfort range is limited here by an upper and a lower comfort limit. Ideally, the comfort range is a part range of the range of the total damping travel, which is limited by the maximum settable height position and the minimum settable height position. The first damping force within the comfort range is preferably constant. It would also be conceivable for the first damping force to be increasing or falling with the spacing between the position of the seat part-side upper part and the height position. The comfort range can advantageously be adapted by parameterisation according to individual preferences or can be adapted to the kinematics of the seat, so a comfortable soft centre range is subjectively perceivable. In this case, it is advantageous if, upon a displacement of the position of the seat part-side upper part proceeding from the maximum or the minimum height position, the comfort range is limited to the maximum or the minimum height position.

According to a further preferred embodiment, upon a displacement of the position of the seat part-side upper part, proceeding from the height position, the first damping force of the damping element, settable by the adjustment device, outside the comfort range of the total damping travel, increases linearly with the spacing between the position of the seat part-side upper part and the height position. However, an increase according to another polynomial function would also be conceivable.

According to a further particularly preferred embodiment, upon a displacement of the position of the seat part-side upper part, in the direction of the height position, a damping force of the damping element, which only corresponds to the preset basic damping force, is settable by the adjustment device. Accordingly, upon a return movement of the seat part-side upper part, a reset can be made to the position-independent preselected basic damping force, so the springing back is experienced more gentle. At the same time, a person on the seat subjectively has the feeling towards the end of the damping travel of being protected by a damping increase. Furthermore, the height position of the seat is stabilised by this type of activation as the seat springs back more softly to the starting position.

According to a further preferred embodiment, a second damping force of the damping element is settable by the adjustment device. This second damping force can preferably be determined with the aid of the total damping travel, the presettable basic damping force, the position of the seat part-side upper part relative to the body-side lower part, the movement direction, the amount of speed and a residual damping travel of the seat part-side upper part relative to the body-side lower part. Ideally, the residual damping travel can be determined from the total damping travel and the position of the seat part-side upper part relative to the body-side lower part. The speed can preferably be determined from at least two temporally consecutive positions of the seat part-side upper part relative to the body-side lower part. A total damping force of the damping element is preferably provided from the sum of the first and second damping force. Accordingly, to avoid/prevent end impacts, the instantaneous speed of the seat part-side upper part can be compared with the damping travel still available and an additional second damping force can optionally be superimposed on the first damping force. The determination according to the invention of the first damping force has the advantage that a certain damping force is already set at low deflection/rebound speeds. A superimposition of the first and the second damping force has the advantage that the progressive transition to hard damping towards the damping travel end or else at higher speeds is less strong and therefore more pleasant. The transition to the end position or speed-dependent damping can therefore be designed to be more homogeneous (favourable for the insulation effect). Conversely, with a hard damper preselection, when a sudden jolt occurs, the damping can be switched to soft to transmit as little energy as possible to the seat part-side upper part if sufficient spring travel is available. A superimposition of the first damping force is therefore also possible in the negative sense.

Upon a displacement of the position of the seat part-side upper part relative to the body-side lower part, proceeding from the maximum height position in the direction of the upper damping travel end, or upon a displacement of the position of the seat part-side upper part relative to the body-side lower part, proceeding from the minimum height position in the direction of the lower damping travel end, a damping force of the damping element, which is increased by an end impact protection factor, is preferably settable by the adjustment device. Ideally, upon a displacement of the position of the seat part-side upper part in the opposite direction, a damping force of the damping element is settable by the adjustment device without an end impact protection factor. Accordingly, an end impact of the seat part-side upper part can be effectively prevented, so an increased sitting comfort is produced. Upon a displacement in the opposite direction, the end impact protection factor is preferably not active. The seat part-side upper part can be returned as quickly as possible into the desired position by a measure of this type, so a further improvement of the sitting comfort is produced.

According to a further preferred embodiment, a characteristic speed with respect to a resonance superelevation of a vibration of the seat part-side upper part relative to the body-side lower part can be identified by the adjustment device. When a characteristic speed of this type is identified, an increased damping force is preferably settable. By measuring the position and speed of the seat part-side upper part relative to the body-side lower part, the excitation can ideally be analysed from the reaction behaviour. At the identified speeds that are characteristic during resonance behaviour, the damper output can therefore be increased. As a result, the factor of a typical resonance superelevation of the vibration amplitude can, for example, be reduced from about 2.5 to below 1.5.

According to a further preferred embodiment, the adjustable damping system comprises an acceleration sensor. Excitations are transmitted from the body-side lower part to the seat part-side upper part. Accordingly, it is preferred if the acceleration sensor is arranged on the body-side lower part. Owing to an advantageous utilisation of this type of acceleration values by the adjustment device, it is possible to temporally more effectively determine the necessary speeds to be determined for the adjustment, so a faster reaction of the damping system to suddenly occurring deflections of the seat part-side upper part relative to the body-side lower part can be achieved. Moreover, the acceleration sensor allows an identification of the driver's movement, i.e. it can be distinguished whether a movement of the upper part takes place as a result of the driver's movement and/or as a result of an excitation by vibrations of the lower part.

The object is further achieved by a driver's seat having an adjustable damping system according to any of the preceding claims.

The object is likewise achieved by a method for adjusting an adjustable damping system for a vehicle seat for damping a movement of a seat part-side upper part relative to a body-side lower part in at least one spatial direction (X, Y, Z), wherein, for damping, at least one damping element is provided, which is adjustable by an adjustment device and is arranged between the seat part-side upper part and the body-side lower part, the method comprising the following steps:

measuring the current position of the seat part-side upper part relative to the body-side lower part by a sensor device;

determining a movement direction of the seat part-side upper part relative to the body-side lower part by the adjustment device from at least two temporally consecutively measured positions of the seat part-side upper part relative to the body-side lower part;

setting a first damping force of the damping element by the adjustment device, wherein the first damping force is determined by the adjustment device depending on a total damping travel, the preset basic damping force, the position of the seat part-side upper part relative to the body-side lower part and the movement direction of the seat part-side upper part relative to the body-side lower part.

A maximum displacement of the position of the seat part-side upper part relative to the body-side lower part is preferably provided by the total damping travel of the damping element, which is limited by an upper and a lower damping travel end. A height position of the seat part-side upper part, being the desired value of the adjustment, relative to the body-side lower part is preferably settable by a height setting device. Ideally, a maximum settable height position is in a range of the total damping travel, which preferably extends between a total damping travel centre and the upper damping travel end. Moreover, it is advantageous if a minimum settable height position is in a range of the total damping travel, which extends between a total damping travel centre and the lower damping travel end.

According to a preferred embodiment, upon a displacement of the position of the seat part-side upper part proceeding from the height position, the first damping force of the damping element set by the adjustment device within a comfort range of the total damping travel is smaller than outside the comfort range. The comfort range is limited here by an upper and a lower comfort limit. Ideally, the comfort range is a part range of the range of the total damping travel, which is limited by the maximum adjustable height position and the minimum adjustable height position. The first damping force within the comfort range is preferably constant. It would also be conceivable for the first damping force to be increasing or falling with the spacing between the position of the seat part-side upper part and the height position. Advantageously, the comfort range can be adapted by parameterisation according to individual preferences or be adapted to the kinematics of the seat so a comfortable soft centre range is subjectively perceivable. It is advantageous here if, upon a displacement of the position of the seat part-side upper part, proceeding from the maximum or the minimum height position, the comfort range is limited to the maximum or the minimum height position.

According to a further preferred embodiment, upon a displacement of the position of the seat part-side upper part, proceeding from the height position, the first damping force of the damping element set by the adjustment device, outside the comfort range of the total damping travel, increases linearly with the spacing between the position of the seat part-side upper part and the height position.

According to a further particularly preferred embodiment, upon a displacement of the position of the seat part-side upper part, in the direction of the height position, a damping force of the damping element, which only corresponds to the preset basic damping force, is set by the adjustment device.

According to a further preferred embodiment, a second damping force of the damping element is set by the adjustment device. This second damping force is preferably determined with the aid of the total damping travel, the presettable basic damping force, the position of the seat part-side upper part relative to the body-side lower part, the movement direction, the amount of speed and a residual damping travel of the seat part-side upper part relative to the body-side lower part. Ideally, the residual damping travel is determined from the total damping travel and the position of the seat part-side upper part relative to the body-side lower part. The speed is preferably determined from at least two temporally consecutive positions of the seat part-side upper part relative to the body-side lower part. A total damping force of the damping element is preferably provided from the sum of the first and second damping force. However, it would also be conceivable for the total damping force of the damping element to be provided from the product of the first and second damping force.

Upon a displacement of the position of the seat part-side upper part, proceeding from the maximum height position in the direction of the upper damping travel end or upon a displacement of the position of the seat part-side upper part proceeding from the minimum height position in the direction of the lower damping travel end, a damping force of the damping element, which is increased by an end impact protection factor, is preferably set by the adjustment device. Ideally, upon a displacement of the position in the opposite direction, a damping force of the damping element is set without an end impact protection factor.

According to a further preferred embodiment, a characteristic speed with respect to a resonance superelevation of a vibration of the seat part-side upper part relative to the body-side lower part is identified by the adjustment device. Upon an identification of a characteristic speed of this type, an increased damping force is then preferably set.

Further advantages, aims and properties of the present invention will be described with the aid of the following description of the accompanying drawings. Similar components may have the same reference numerals in the various embodiments.

DETAILED DESCRIPTION

Figure 1:
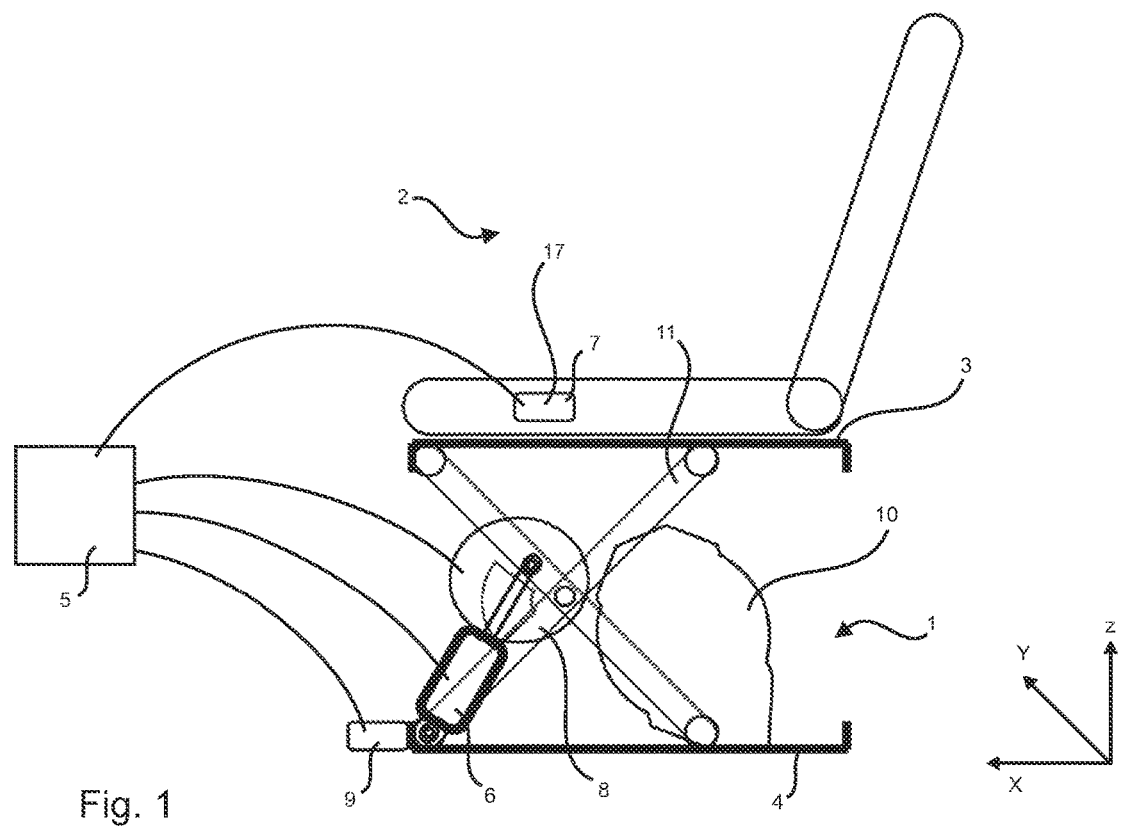
FIG. 1 is a side view of a vehicle seat having a damping system.

FIG. 1 shows a vehicle seat (2) having an adjustable damping system (1) for damping a movement of a seat part-side upper part (3) relative to a body-side lower part (4) in at least one spatial direction (X, Y, Z), according to one possible embodiment. The damping system comprises a damping element (6), which is adjustable by an adjustment device (5) and is arranged between the seat part-side upper part (3) and the body-side lower part (4).

A scissor-type frame (11) and a spring element (10) are further arranged between the seat part-side upper part (3) and the body-side lower part (4). In this embodiment, the spring element (10) is configured as a pneumatic spring element. The damping element (6) is arranged here between a lower linkage point of the first scissor arm and the second scissor arm. An acceleration sensor (9) can optionally also be arranged on the lower linkage point. The acceleration of the seat part-side upper part (3) relative to the body-side lower part (4) can be determined here from the angular acceleration of the rotation in the linkage point.

The damping system (1) further comprises a damping setting device (7), with which a basic damping force is specifically presettable by a user of the seat. The current position of the seat part-side upper part (3) relative to the body-side lower part (4) can be measured by a sensor device (8). In this embodiment, the sensor device (8) is configured as a rotating height sensor. A displacement of the seat part-side upper part (3) relative to the body-side lower part (4) brings about a rotation here in the height sensor, wherein the displacement distance and therefore the position of the seat part-side upper part (3) relative to the body-side lower part (4) can be determined from the rotation angle.

The sensor device (8), the damping setting device (7) and the damping element are connected to an adjustment device (5). If the adjustment is based on acceleration data of the seat part-side upper part (3), the acceleration sensor (9) is obviously also connected to the adjustment device (5).

The damping system (1) further comprises a height setting device (17), with which a height position of the seat part-side upper part (3) is settable relative to the body-side lower part (4). The height setting device (17) may, for example, further comprise an adjustable pump, which is connected to the pneumatic spring element (10). The height setting would thus be realised by the feeding or removal of air into or out of the pneumatic spring element (10). Alternatively, additional actuators would also be conceivable.

Figure 2:
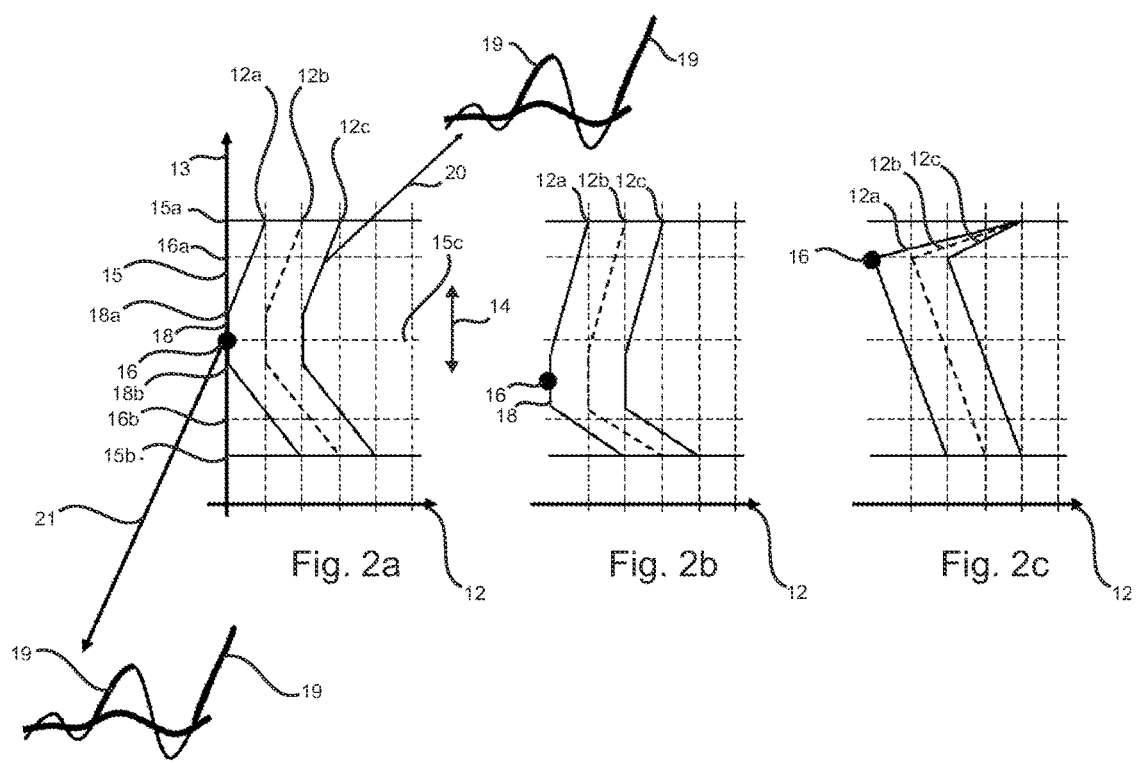
FIG. 2a, b, c are in each case a graph of the first damping force depending on the position of the seat part-side upper part relative to the body-side lower part.

FIGS. 2a, 2b and 2c each show a graph of the first damping force (12) depending on the position (13) of the seat part-side upper part (3) relative to the body-side lower part (4). The abscissa describes here the first damping force (12) and the ordinate describes the position (13) of the seat part-side upper part (3) relative to the body-side lower part (4). The first damping force (12) of the damping element (6) is set with the aid of a basic damping force presettable by the damping setting device (7), the position (13) of the seat part-side upper part (3), measurable by a sensor device (8), relative to the body-side lower part (4) and the movement direction (14) of the seat part-side upper part (3) relative to the body-side lower part (4) by the adjustment device (5). The movement direction (14) is determined from at least two temporally consecutive positions (13) of the seat part-side upper part (3), measurable by a sensor device (8), relative to the body-side lower part (4).

The graphs (12a, 12b, 12c) show the course of the first damping force (12) with a differently preset basic damping force. A maximum displacement of the position (13) of the seat part-side upper part (3) relative to the body-side lower part (4) is provided by a maximum damping travel (15) of the damping element (6). The maximum damping travel (15) is limited here by an upper (15a) and a lower damping travel end (15b). The height position (16) of the seat part-side upper part (3) relative to the body-side lower part (4), which is settable by the height adjustment device (17), is the desired value of the adjustment. A maximum settable height position (16a) is in a range of the total damping travel (15), which extends between a total damping travel centre (15c) and the upper damping travel end (15a), and a minimum adjustable height position (16b) is in a range of the total damping travel (15), which extends between a total damping travel centre (15c) and the lower damping travel end (15a).

The height position (16) is preset in the damping travel centre (15c) in FIG. 2a. Upon a displacement of the position (13) in the direction of the lower damping travel end (15b), the damping force (12) increases more strongly than upon a displacement in the direction of the upper damping travel end (15a). This results in an increased sitting comfort as an impact upon a movement downwards is subjectively perceived to be more unpleasant than an upper end impact.

The height position (16) between the total damping travel centre (15c) and the lower damping travel end (15b) is preset in FIG. 2b. A presetting of this type has a stronger increase of the first damping force (12) upon a displacement of the position (13) in the direction of the lower damping travel end (15b), as there is less damping travel available.

In FIG. 2c, the preset height position (16) corresponds to the maximum height position (16a). In this case, less damping travel is available in the direction of the upper damping travel end (15a). Accordingly, the first damping force (12) has a stronger increase upon a displacement of the position (13) upwards in the direction of the upper damping travel end (15a).

The increase in the first damping force (12) with respect to a movement direction of the seat part-side upper part (3) relative to the body-side lower part (4) can advantageously be defined freely by selecting corresponding parameters. For example, it would also be conceivable to set a higher damping on rebound. A higher damping of this type on rebound assists the actuation of the pedals of the motor vehicle by a driver located on the seat.

The first damping force (12) of the damping element (6), depending on the position (13) of the seat part-side upper part (3) relative to the body-side lower part (4), has a comfort range (18) limited by an upper (18a) and a lower comfort limit (18b). In this comfort range (18), the damping force (12) is constant with respect to a displacement of the position (13) of the seat part-side upper part (3) relative to the body-side lower part (4). This can be seen in FIGS. 2a and 2b. In FIG. 2c, the preset height position (16) corresponds to the maximum presettable height position (16a). In this case, the upper (18a) and the lower comfort limit (18b) equal the height position (16).

A second damping force (19) of the damping element (6) is presettable by the adjustment device (5). This second damping force (19) can be determined with the aid of the total damping travel (15), the presettable basic damping force, the position (13) of the seat part-side upper part (3) relative to the body-side lower part (4), the movement direction (14), the amount of speed and a residual damping travel of the seat part-side upper part (3) relative to the body-side lower part (4). The residual damping travel can be determined from the maximum damping travel (15) and the position (13) of the seat part-side upper part (3) relative to the body-side lower part (4), and the speed can be determined from at least two temporally consecutive positions (13) of the seat part-side upper part (3) relative to the body-side lower part (4). The total damping force of the damping element (5) is finally provided from the sum of the first (12) and second damping force (19). The second damping force (19) can be superimposed in a rectified manner on the first damping force (12). This is necessary, for example, if only a little residual damping travel is available (position (20) in FIG. 2a). An end impact can therefore be effectively prevented. On the occurrence of a sudden jolt, the second damping force (19) can be directed counter to the first damping force (12), so the total damping force is switched to be softer. This is only sensible when there is adequate residual damping travel available (position (21)). Therefore, the seat part-side upper part is deflected as little as possible.

Figure 3:
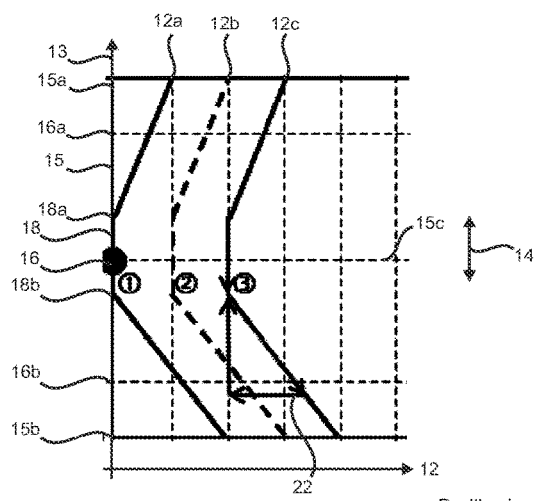
FIG. 3 is a graph of the first damping force depending on the position of the seat part-side upper part relative to the body-side lower part according to a further embodiment.

FIG. 3 is a graph analogous to FIG. 2a. Moreover, the graph shows an alternative return displacement travel (22) of the position (13) of the seat part-side upper part (3). Upon this return displacement travel (22), only the position-independent preset basic damping force is active. An embodiment of this type results in a softer and/or faster return of the seat part-side upper part (3). At the same time, the seat part-side upper part (3) is stabilised with respect to its height, as this rebounds more softly into the starting position.

Figure 4:
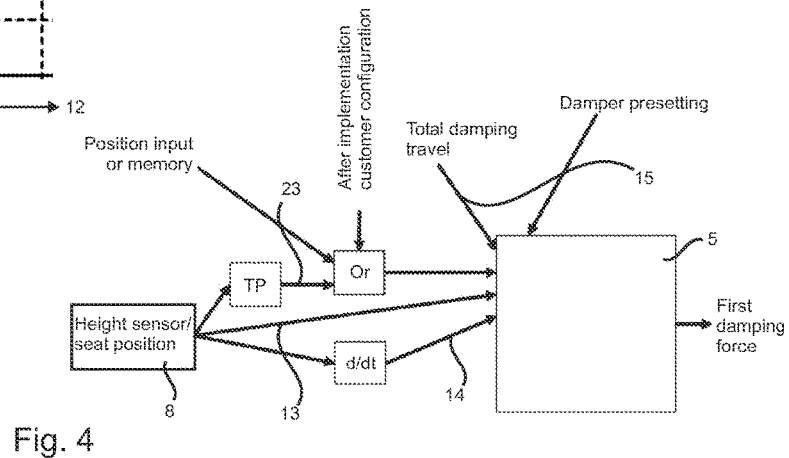
FIG. 4 is an algorithm structure for determining the first damping force.

FIG. 4 shows an algorithm structure for determining the first damping force (12) of the damping element (6) by the adjustment device (5). The position (13) of the seat part-side upper part (3) relative to the body-side lower part (4) is measured by the sensor device (8) and is fed to the adjustment device (5). Furthermore, an averaged position is determined by a low-pass filter or mean value formation filter (TP) and transferred to the adjustment device (5). This value is the desired value of the adjustment. Likewise, a position input could be input from a memory or otherwise. Likewise, the movement direction (14) of the position (13) is fed to the adjustment device (5). Furthermore, the first damping force (12) is determined with the aid of a basic damping force presettable by a damping setting device (7) and the total damping travel (15). The first damping force is calculated here with the aid of a characteristic curve or a lookup table.

Figure 5:
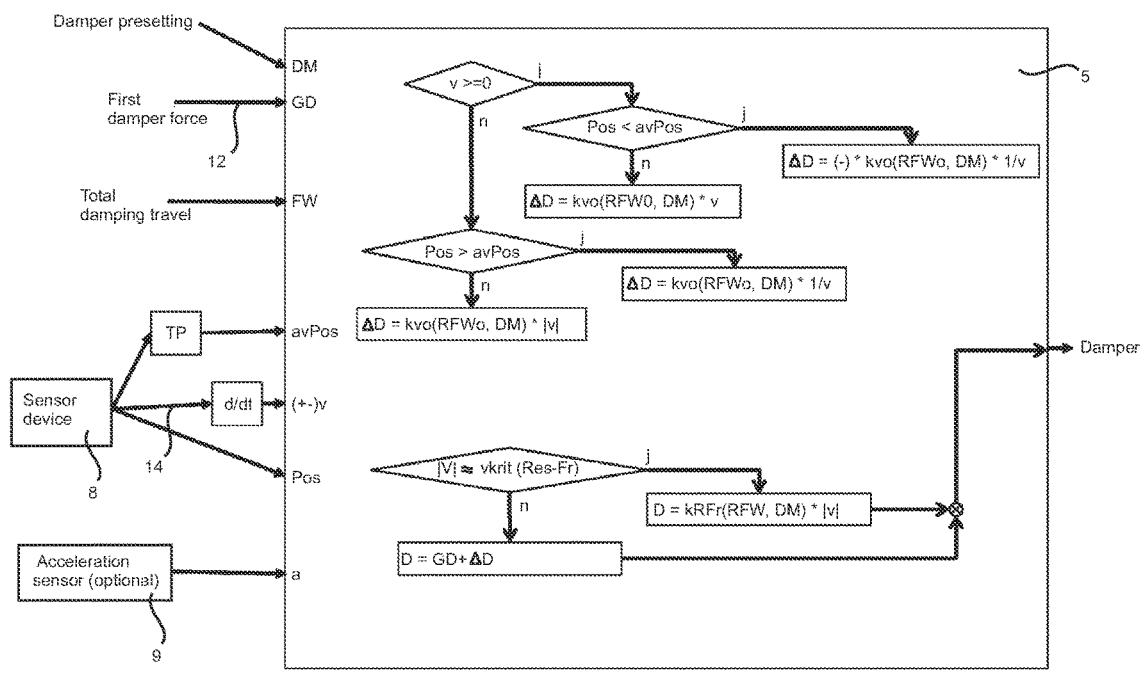
FIG. 5 is an algorithm structure for determining the second damping force.
Figure 6:
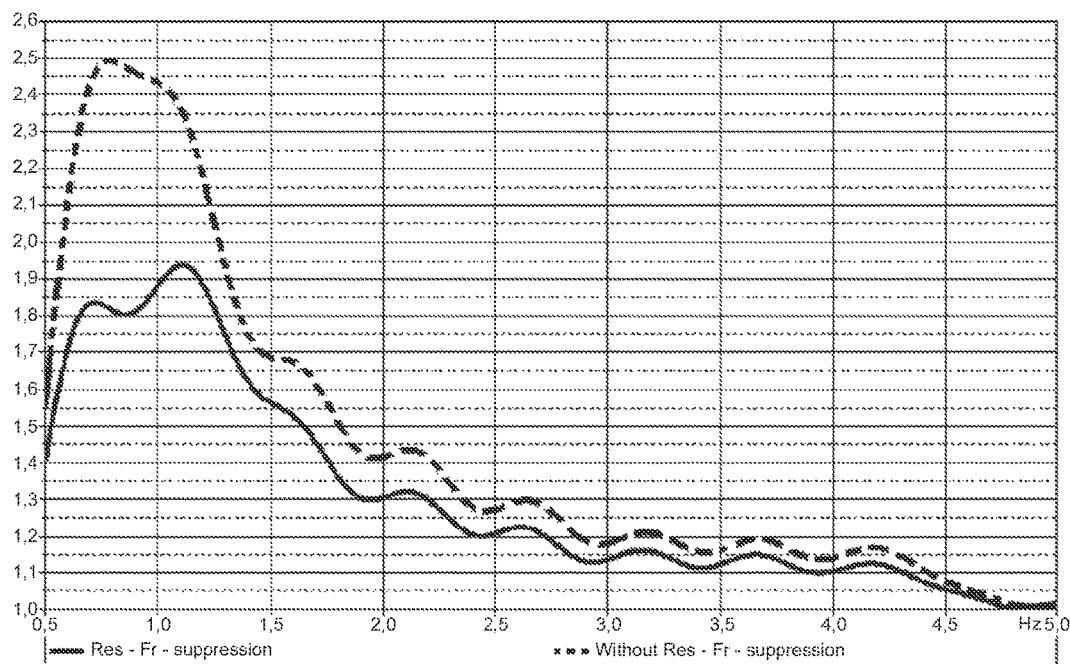
FIG. 6 is a graph for resonance suppression at characteristic speeds.

FIG. 5 shows an algorithm structure for determining the second damping force (19, ΔD) of the damping element (6) by the adjustment device (5). The following parameters are fed to the adjustment device (5): the position (13) of the seat part-side upper part (3) relative to the body-side lower part (4) measured by the sensor device (8), the basic damping force (DM) presettable by the damping setting device (7), an averaged position (avPos) determined by a low-pass or mean value formation filter (TP), the total damping travel (FW), the first damping force (12, GD), the movement direction (14) and the speed (V) of the seat part-side upper part (3) relative to the body-side lower part (4). Optionally, the values of an acceleration sensor (9) can also be included. The second damping force (19, ΔD) is formed from a first parameter (kvo), which is a function of the residual damping travel (RFWo) and the presettable basic damping force (DM), and a speed factor $V^n$ (n=+/−1). If V>=0, at a current position (13, Pos), which is greater than the averaged position (avPos), the first parameter (kvo) is multiplied by the amount of the speed (|V|). In the reverse case, the first parameter (kvo) is multiplied by the reciprocal speed (1/V). If V<0, at a current position (13, Pos), which is greater than the averaged position (avPos), the first parameter (kvo) is multiplied by the reciprocal speed (1/V) and, in the reverse case, by the amount of speed (|V|). The total damping force (D) is formed from the sum of the first damping force (12, GD) and the second damping force (19, ΔD) if the speed of the seat part-side upper part (3) relative to the body-side lower part (4) does not correspond to any characteristic speed ($V_{krit(Res-Fr)}$) with respect to a resonance superelevation of a vibration of the seat part-side upper part (3) relative to the body-side lower part (4). If a characteristic speed ($V_{krit(Res-Fr)}$) of this type with respect to a resonance superelevation is identified by the adjustment device (5), the total damping force (D) is provided by the product of the amount of speed (V) and a second parameter (kRFr), which is also a function of the residual damping travel (RFWo) and the presettable basic damping force (DM). The second parameter (kRFr) is greater than the first parameter (kvo), so an increased damping is set at a characteristic speed. In the algorithm structure from FIG. 5, the corresponding total damping forces (D) are connected by an or-link, i.e. in the case of resonance or outside resonance. Accordingly, the corresponding total damping force (D) is set depending on the characteristic speed ($V_{krit(Res-Fr)}$) at the damper. FIG. 6 shows the vibration amplitude depending on the vibration frequency of the seat part-side upper part (3) for the case with and without a suppression of the resonance behaviour. A typical resonance superelevation of a factor of about 2.5 can therefore be reduced to below 1.5.

Figure 7:
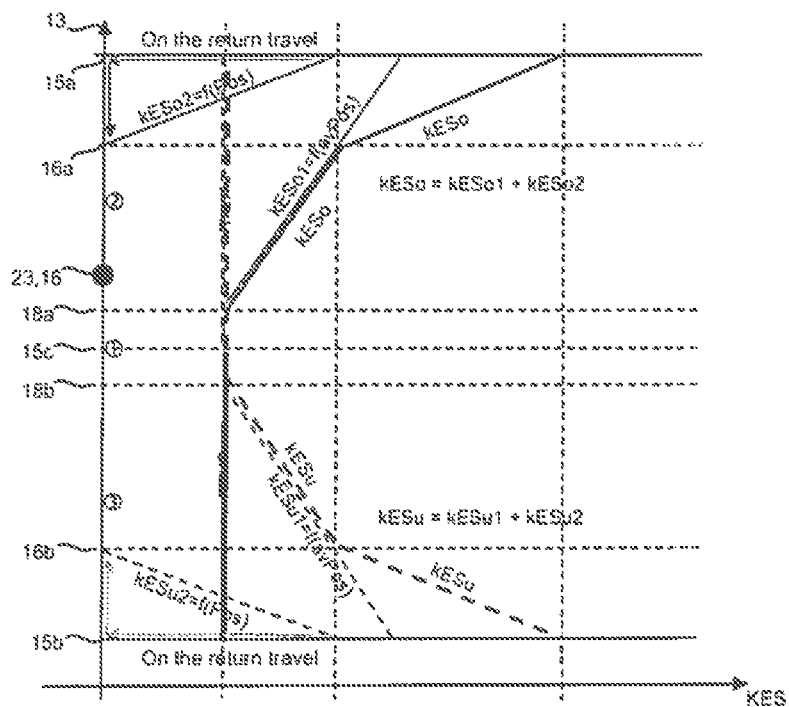
FIG. 7 is a graph of the second damping force depending on the position of the seat part-side upper part relative to the body-side lower part according to a further embodiment.

FIG. 7 is a graph of the damping force depending on the position of the seat part-side upper part relative to the body-side lower part according to a further embodiment. In the graph, the abscissa describes the third parameter kES and the ordinate describes the position (13) of the seat part-side upper part (3) relative to the body-side lower part (4). According to this embodiment, $D=kES \cdot V^n$ applies for the damping force. The third parameter kES is a function of: upper damping travel end (15a, FEo), lower damping travel end (15b, FEu), damping travel centre (15c, FEm), maximum height position (16a, maxo), minimum height position (16b, minu), upper comfort limit (18a, KGo), lower comfort limit (18b, KGu), averaged position (23, avPos), current position (13, Pos), preset basic damping force (DM) and the movement direction (14,sgn(V)). The exponent n is in the range between 0 . . . ∞. At n=0, D is independent of the amount of speed and corresponds to the first damping force. At 0<n<1, the damping system (1) has a degressive characteristic and at n>=1, it has a progressive characteristic. Wth a fixed exponent n, the third parameter kES determines the characteristic of the damping force. For V>=0 there applies: kES=kESo and for V<0 there applies: kES=kESu. The third parameter kES is composed of two components: kES=kES1+kES2 (kESo=kESo1+kESo2, kESu=kESu1+kESu2), wherein kES2 is only unequal to 0 at a position in a range between the maximum height position (16a, maxo) and the upper damping travel end (15a, FEo) and in a range between the minimum height position (16b, maxu) and the lower damping travel end (15b, FEu). If the current position (13, Pos) of the seat part-side upper part (3) exceeds the maximum height position (16a, maxo) or the minimum height position (16b, maxu), kES becomes higher as a result of the kES2 proportions. The damping force is therefore increased by an end impact protection factor kES2, so an end impact of the seat part-side upper part (3) can be effectively avoided. In order to increase the comfort, the seat part-side upper part (3) should be returned as quickly as possible to the averaged position (23) or to the desired value of the adjustment. Accordingly, at the return movement, the kES2 proportion is set at 0.

All the features disclosed in the application documents are claimed as essential to the invention if they are novel individually or in combination in relation to the prior art.

LIST OF REFERENCE SIGNS 1 adjustable damping system
2 vehicle seat
3 seat part-side upper part
4 body-side lower part
5 adjustment device
6 damping element
7 damping setting device
8 sensor device
9 acceleration sensor
10 spring element
11 scissor-type frame
12 first damping force
12a first damping force depending on a first presettable basic damping force
12b first damping force depending on a second presettable basic damping force
12c first damping force depending on a third presettable basic damping force
13 position of the seat part-side upper part
14 movement direction
15 maximum damping travel
15a upper damping travel end
15b lower damping travel end
15c total damping travel centre
16 height position
16a maximum height position
16b minimum height position
17 height setting device
18 comfort range
18a upper comfort limit
18b lower comfort limit
19 second damping force
20 position of the seat part-side upper part relative to the body-side lower part
21 position of the seat part-side upper part relative to the body-side lower part
22 return displacement travel
23 averaged position
24a example position 1
24b example position 2
24c example position 3
DM presettable basic damping force
GD first damping force
FW total damping travel
Pos position of the seat part-side upper part relative to the body-side lower part
avPos averaged position of the seat part-side upper part relative to the body-side lower part
D total damping force
ΔD second damping force
V speed
RFWo residual damping travel
TP low-pass or mean value formation filter
$V_{krit(Res-Fr)}$ characteristic speed
kvo first parameter
kRFr second parameter
kES third parameter
kES2 end impact protection factor
FEo upper damping travel end
FEu lower damping travel end
FEm damping travel centre
maxo maximum height position
maxu minimum height position
KGo upper comfort limit
KGu lower comfort limit
X, Y, Z spatial directions

The invention claimed is:

1. An adjustable damping system for a vehicle seat for damping a movement of a seat part-side upper part relative to a body-side lower part in at least one spatial direction, comprising:

at least one damping element arranged between the seat part-side upper part and the body-side lower part, a sensor configured to measure a position of the seat part-side upper part relative to the body-side lower part, wherein a movement direction of the seat part-side upper part can be determined by at least two temporally consecutive positions of the seat part-side upper part measured by the sensor, an adjustment device configured to set a first damping force of the at least one damping element, wherein the adjustment device is configured to determine the first damping force, which depends on:

a total damping travel of the at least one damping element, a preset basic damping force presettable by a damping setting device, the position of the seat part-side upper part relative to the body-side lower part, and the movement direction of the seat part-side upper part relative to the body-side lower part wherein a height position of the seat part-side upper part is settable relative to the body-side lower part by a height setting device, wherein a maximum settable height position is in a range of the total damping travel, which extends between a total damping travel centre and an upper damping travel end, wherein a minimum settable height position is in a range of the total damping travel, which extends between the total damping travel centre and a lower damping travel end, and wherein upon a displacement of the position of the seat part-side upper part, proceeding from the height position, the first damping force of the at least one damping element, settable by the adjustment device, within a comfort range of the total damping travel, is smaller than outside the comfort range, wherein said comfort range is limited by an upper and a lower comfort limit, wherein the comfort range is a part range of a range of the total damping travel, which is limited by the maximum settable height position and the minimum settable height position;

wherein a second damping force of the at least one damping element is settable by the adjustment device, wherein this second damping force can be determined depending on the total damping travel, the preset basic damping force, the position of the seat part-side upper part relative to the body-side lower part, the movement direction, an amount of speed and a residual damping travel of the seat part-side upper part relative to the body-side lower part;

wherein the speed can be determined from at least two temporally consecutive positions of the seat part-side upper part relative to the body-side lower part and wherein a total damping force of the at least one damping element is provided from a sum of the first and second damping force.

2. The adjustable damping system according to claim 1, wherein a maximum displacement of the position of the seat part-side upper part relative to the body-side lower part is provided by the total damping travel of the at least one damping element, which is limited by the upper and the lower damping travel end.

3. The adjustable damping system according to claim 1, wherein the first damping force within the comfort range is constant or increasing or falling with a spacing between the position of the seat part-side upper part and the height position, wherein, upon the displacement of the position of the seat part-side upper part, proceeding from the maximum or the minimum height position, the comfort range is limited to the maximum or the minimum height position.

4. The adjustable damping system according to claim 2 wherein, upon the displacement of the position of the seat part-side upper part, proceeding from the height position, the first damping force of the at least one damping element, settable by the adjustment device, outside the comfort range of the total damping travel, increases linearly with a spacing between the position of the seat part-side upper part and the height position.

5. The adjustable damping system according to claim 1, wherein, upon the displacement of the position of the seat part-side upper part, in a direction of the height position, the first damping force of the at least one damping element, which only corresponds to the preset basic damping force, is settable by the adjustment device.

6. The adjustable damping system according to claim 1, wherein the residual damping travel can be determined from the total damping travel and the position of the seat part-side upper part relative to the body-side lower part.

7. The adjustable damping system according to claim 1, wherein, upon the displacement of the position of the seat part-side upper part, proceeding from the maximum height position in a direction of the upper damping travel end, or upon the displacement of the position of the seat part-side upper part, proceeding from the minimum height position in a direction of the lower damping travel end, the second damping force of the at least one damping element settable by the adjustment device, which second damping force is increased by an end impact protection factor, wherein, upon the displacement of the position of the seat part-side upper part in an opposite direction, the second damping force of the at least one damping element is settable by the adjustment device without an end impact protection factor.

8. The adjustable damping system according to claim 1, wherein characteristic speeds with regard to a resonance superelevation of a vibration of the seat part-side upper part relative to the body-side lower part can be identified by the adjustment device, wherein, upon identification of a characteristic speed, an increased damping force is settable.

9. The adjustable damping system according to claim 1, wherein the adjustable damping system comprises an acceleration sensor.

10. A vehicle seat having an adjustable damping system according to claim 1.

11. A method for adjusting an adjustable damping system for a vehicle seat for damping a movement of a seat part-side upper part relative to a body-side lower part in at least one spatial direction, wherein, for damping, at least one damping element is provided, which is adjustable by an adjustment device and is arranged between the seat part-side upper part and the body-side lower part, wherein the method comprises the following steps:

measuring a position of the seat part-side upper part relative to the body-side lower part by a sensor device;

determining a movement direction of the seat part-side upper part relative to the body-side lower part by the adjustment device from at least two temporally consecutively measured positions of the seat part-side upper part relative to the body-side lower part;

setting a first damping force of the at least one damping element by the adjustment device, wherein the first damping force is determined by the adjustment device depending on a total damping travel, a preset basic damping force, the position of the seat part-side upper part relative to the body-side lower part and the movement direction of the seat part-side upper part relative to the body-side lower part, wherein a height position of the seat part-side upper part is settable relative to the body-side lower part by a height setting device, wherein a maximum settable height position is in a range of the total damping travel, which extends between a total damping travel centre and an upper damping travel end, wherein the minimum settable height position is in a range of the total damping travel, which extends between the total damping travel centre and a lower damping travel end, and wherein upon a displacement of the position of the seat part-side upper part, proceeding from the height position, the first damping force of the at least one damping element, settable by the adjustment device, within a comfort range of the total damping travel, is smaller than outside the comfort range, wherein said comfort range is limited by an upper and a lower comfort limit, wherein the comfort range is a part range of a range of the total damping travel, which is limited by the maximum settable height position and the minimum settable height position;

wherein a second damping force of the at least one damping element is settable by the adjustment device, wherein this second damping force can be determined depending on the total damping travel, the preset basic damping force, the position of the seat part-side upper part relative to the body-side lower part, the movement direction, an amount of speed and a residual damping travel of the seat part-side upper part relative to the body-side lower part;

wherein the speed can be determined from at least two temporally consecutive positions of the seat part-side upper part relative to the body-side lower part and wherein a total damping force of the at least one damping element is provided from a sum of the first and second damping force.

12. The method according to claim 11, wherein a maximum displacement of the position of the seat part-side upper part relative to the body-side lower part is provided by the total damping travel of the at least one damping element, which is limited by the upper and the lower damping travel end.

13. The method according to claim 11, wherein the first damping force within the comfort range is constant or increasing or falling with a spacing between the position of the seat part-side upper part and the height position, wherein, upon the displacement of the position of the seat part-side upper part, proceeding from the maximum or the minimum height position, the comfort range is limited to the maximum or the minimum height position.

14. The method according to claim 11 wherein, upon the displacement of the position of the seat part-side upper part, proceeding from the height position, the first damping force of the at least one damping element, settable by the adjustment device, outside the comfort range of the total damping travel, increases linearly with a spacing between the position of the seat part-side upper part and the height position.

15. The method according to claim 11, wherein, upon the displacement of the position of the seat part-side upper part, in a direction of the height position, the first damping force of the at least one damping element, which only corresponds to the preset basic damping force, is settable by the adjustment device.

16. The method according to claim 11, wherein the residual damping travel can be determined from the total damping travel and the position of the seat part-side upper part relative to the body-side lower part.

17. The method according to claim 11, wherein, upon the displacement of the position of the seat part-side upper part, proceeding from the maximum height position in a direction of the upper damping travel end, or upon the displacement of the position of the seat part-side upper part, proceeding from the minimum height position in a direction of the lower damping travel end, the second damping force of the at least one damping element settable by the adjustment device, which second damping force is increased by an end impact protection factor, wherein, upon the displacement of the position of the seat part-side upper part in an opposite direction, the second damping force of the at least one damping element is settable by the adjustment device without an end impact protection factor.

18. The method according to claim 11, wherein characteristic speeds with regard to a resonance superelevation of a vibration of the seat part-side upper part relative to the body-side lower part can be identified by the adjustment device, wherein, upon identification of a characteristic speed, an increased damping force is settable.

* * * * *